United States Patent [19]

Takanashi et al.

[11] Patent Number: 4,757,375
[45] Date of Patent: Jul. 12, 1988

[54] COLOR TELEVISION IMAGE PICKUP DEVICE WITH A STRIPE FILTER PARALLEL TO SCANNING DIRECTION

[75] Inventors: Itsuo Takanashi, Kamakura; Shintaro Nakagaki, Fujisawa; Hiroshi Ichimura; Takashi Kuriyama, both of Tokyo; Tsutou Asakura, Yokohama, all of Japan

[73] Assignee: Victor Company of Japan, Ltd., Japan

[21] Appl. No.: 875,348

[22] Filed: Jun. 17, 1986

[30] Foreign Application Priority Data

Jun. 24, 1985 [JP] Japan .................................. 60-137264
Jul. 8, 1985 [JP] Japan .................................. 60-148253

[51] Int. Cl.$^4$ .......................... H04N 9/083; H04N 9/07
[52] U.S. Cl. ........................................ 358/47; 358/44; 358/55
[58] Field of Search ............... 358/41, 43, 44, 47, 358/909, 45, 46, 68, 55

[56] References Cited

U.S. PATENT DOCUMENTS

| | | | |
|---|---|---|---|
| 3,763,480 | 10/1973 | Weimer | 340/173 |
| 3,846,579 | 11/1974 | Takanashi et al. | 358/47 |
| 3,858,079 | 12/1974 | Miyama et al. | 358/43 |
| 4,318,123 | 3/1982 | Knop | 358/43 |
| 3,558,807 | 1/1971 | Kurokawa | 358/45 |
| 4,578,699 | 3/1986 | Takanashi et al. | 358/44 |
| 4,614,966 | 9/1986 | Yunoki et al. | 358/41 |

FOREIGN PATENT DOCUMENTS

| | | |
|---|---|---|
| 820053 | 9/1959 | United Kingdom . |
| 1092881 | 11/1967 | United Kingdom . |
| 1438071 | 6/1976 | United Kingdom . |

*Primary Examiner*—James J. Groody
*Assistant Examiner*—Robert M. Bauer
*Attorney, Agent, or Firm*—Andrus, Sceales, Starke & Sawall

[57] ABSTRACT

A color image pickup device comprises an image pickup tube, a color stripe filter comprising a plurality of stripes, a circuit for obtaining a color multiplexed signal by multiplexing color components obtained via the color stripe filter in a direction perpendicular to a scanning direction of the image pickup tube, and a circuit for producing a color demodulated signal by subjecting the color multiplexed signal to a color demodulation. The color stripe filter is arranged on the image pickup tube so that a longitudinal direction of the stripes thereof is substantially parallel to the scanning direction.

20 Claims, 2 Drawing Sheets

COLOR TELEVISION IMAGE PICKUP DEVICE WITH A STRIPE FILTER PARALLEL TO SCANNING DIRECTION

BACKGROUND OF THE INVENTION

The present invention generally relates to color image pickup devices, and more particularly to a color image pickup device which obtains a color multiplexed signal from a pickup tube provided with a color stripe filter and performs a color demodulation in a single tube color television camera, for example.

In a conventional single tube color television camera, a color multiplexed signal is obtained by performing a scan in a direction perpendicular to the longitudinal direction of stripes of a color stripe filter which comprises a repetition of green (G), cyan (C) and white (W or transparent) stripes.

However, because the scanning is performed in the direction perpendicular to the longitudinal direction of the stripes of the color stripe filter, color components obtained via the color stripe filter are multiplexed by a carrier of 4 MHz which is relatively high for one period of the color stripe filter (that is, for one group of the G, C and W stripes). Generally, noise is high in the high frequency range, and the degree of modulation of the image pickup tube is low in the high frequency range. As a result, the signal-to-noise ratio becomes poor. In addition, the image pickup tube cannot reproduce color stripes with a high fidelity, and there is a problem in that the color reproducibility is poor.

Furthermore, since the scanning is performed in the direction perpendicular to the longitudinal direction of the stripes of the color stripe filter, the color components obtained via the color stripe filter are multiplexed in the sequence corresponding to the scanning direction. For this reason, the frequency band of the luminance signal becomes limited to a narrow frequency band by the color multiplexed signal (carrier), and there is a problem in that it is impossible to obtain a satisfactory horizontal resolution.

SUMMARY OF THE INVENTION

Accordingly, it is a general object of the present invention to provide a novel and useful color image pickup device in which the problems described heretofore are eliminated.

Another and more specific object of the present invention is to provide a color image pickup device in which color components are multiplexed by a carrier having a relatively low carrier frequency. According to the color image pickup device of the present invention, it is possible to obtain a high signal-to-noise ratio and to obtain a satisfactory color reproducibility. In addition, it is possible to have a wide frequency band for the luminance signal and to obtain a satisfactory horizontal resolution.

Other objects and further features of the present invention will be apparent from the following detailed description when read in conjunction with the accompanying drawings.

DETAILED DESCRIPTION

Figure 1:
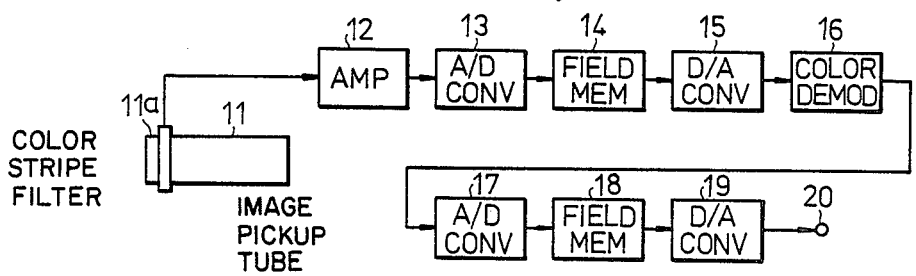
FIG. 1 is a system block diagram showing a first embodiment of the color image pickup device according to the present invention.
Figure 2:
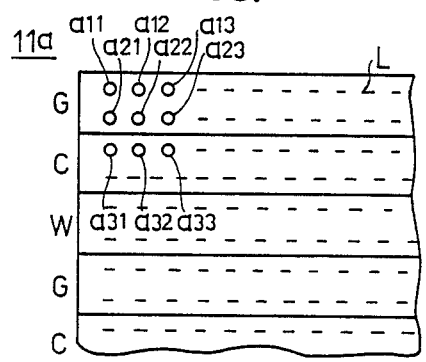
FIG. 2 is a diagram showing a portion of a color stripe filter used in the first embodiment.

FIG. 1 shows a first embodiment of the color image pickup device according to the present invention, and FIG. 2 shows a portion of a color stripe filter used in the first embodiment for explaining the relationship between scanning lines and sampling positions.

As shown in FIG. 2, a color stripe filter 11a comprises a repetition of green (G), cyan (C) and white (W or transparent) stripes. In the present embodiment, the color image pickup device performs the scanning in a longitudinal direction of the stripes of the color stripe filter 11a. A number of scanning lines L is set to such a number that the color stripe filter 11a can reproduce the samples. For example, the number of the scanning lines L for a stripe group consisting of the G, C and W stripes is set to six. There are 240 such stripe groups (corresponding to one field of the NTSC system), for example. According to the energy step system, a fundamental wave component and a second harmonic component are to be reproduced. Thus, it may be understood from the sampling theorem that it is possible to reproduce the fundamental wave component and the second harmonic component when there are four or more scanning lines L per one stripe group.

Figure 3A:
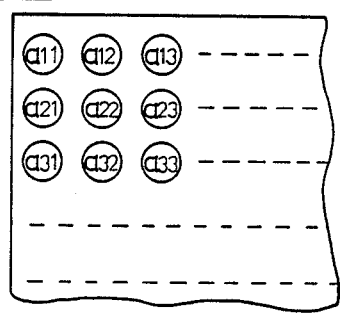
FIGS. 3A and 3B are diagrams for explaining a write-in operation to a memory.

In FIG. 1, a signal obtained from an image pickup tube 11 which is provided with the color stripe filter 11a shown in FIG. 2 is passed through a preamplifier 12 and is supplied to an analog-to-digital (A/D) converter 13 wherein the signal is converted into a digital signal. The output digital signal of the A/D converter 13 is supplied to a field memory 14. As shown in FIG. 3A, the digital signal is successively written into the field memory 14 in a sequence of sampled data at sampling points a11, a12, a13, ..., a21, a22, a23, ..., a31, a32, a33, ... shown in FIG. 2. In other words, the sampled data are successively written into the field memory 14 in a sequence of the sampled data arranged in the horizontal direction. The stored sampled data are successively read out of the field memory 14 in a sequency of the sampled data at the sampled points a11, a21, a31, ..., a12, a22, a32, ..., a13, a23, a33, .... In other words, the stored sampled data are succesively read out from the field memory 14 in a sequence of the stored sampled data arranged in a direction perpendicular to the write-in direction, that is, in the vertical direction. The output signal of the field memory 14 is supplied to a digital-to-analog (D/A) converter 15 wherein the digital signal is converted into an analog signal.

Figure 4:
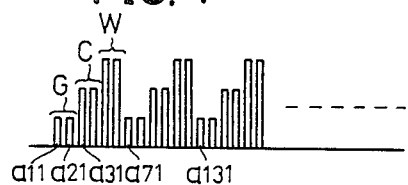
FIG. 4 shows an input signal waveform to a color demodulating circuit in the color image pickup device according to the present invention.

The output signal of the D/A converter 15 is shown in FIG. 4, and this signal is simlar to a color multiplexed signal obtained according to the general step energy system. When the sampling theorem is satisfied, the output signal of the D/A converter 15 becomes similar to the color multiplexed signal obtained by multiplexing the color components according to the step energy system, and it is possible to reproduce a fundamental wave component signal and a second harmonic component signal with a high fidelity even when the sampling phase and frequency change.

Figure 3B:
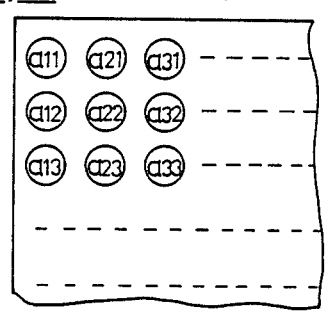

The output signal of the D/A converter 15 is supplied to a color demodulating circuit 16 which has a construction similar to a color demodulating circuit used in the case of the general step energy system. The signal supplied to the color demodulating circuit 16 is subjected to a color demodulation, but the picture which is obtained will be rotated by 90° because the read-out from the field memory 14 is performed in the vertical direction. Hence, an output signal of the color demodulating circuit 16 is supplied to an A/D converter 17 wherein the signal is converted into a digital signal. As shown in FIG. 3B, the digital signal is successively written into a field memory 18 in a sequence of sampled data at sampling points a11, a21, a31, ..., a12, a22, a32, ..., a13, a23, a33, .... The stored sampled data are successively read out of the field memory 18 in a sequence of the sampled data at the sampled points a11, a12, a13, ..., a21, a22, a23, ..., a31, a32, a33, .... In other words, the stored sampled data are successively read out from the field memory 18 in a sequence of the stored sampled data arranged in a direction perpendicular to the write-in direction. The output signal of the field memory 18 is supplied to D/A converter 19 wherein the digital signal is converted into an analog signal, and the output signal of the D/A converter 19 is obtained via an output terminal 20.

According to the present embodiment, the scanning is performed in the longitudinal direction of the stripes of the color stripe filter 11a. For this reason, the color components are multiplexed by a carrier having a frequency of 94.5 kHz (=fundamental wave component frequency of 15.75 kHz×6) which is relatively low for one period (corresponding to one horizontal scanning period of the NTSC system) of the stripe group comprising the G, C and W stripes. As a result, the signal-to-noise ratio is high. In addition, the image pickup tube can reproduce the color stripes with a high fidelity, and the color reproducibility is satisfactory.

Furthermore, since the scanning is performed in the longitudinal direction of the stripes of the color stripe filter 11a, the color components obtained via the color stripe filter 11a are not multiplexed in a sequence corresponding to the horizontal direction (scanning direction). For this reason, it is possible to obtain the same resolution as in the case of a black-and-white picture, and the frequency band of the luminance signal will not be limited by the color multiplexed signal (carrier). The frequency band of the luminance signal can be made wide, and it is possible to obtain a satisfactory horizontal resolution.

In the present embodiment, the color stripe filter 11a comprises 240 stripe groups (corresponding to one field of the NTSC system). When it is assumed that the vertical resolution for one stripe group is two television scanning lines, the vertical resolution as a whole is 480 television scanning lines, and the vertical resolution is the same as that of the conventional image pickup device.

In the case where the image pickup tube is designed to scan in the vertical direction, the color stripe filter should be arranged so that longitudinal direction of the stripes of the color stripe filter coincides with the vertical direction. In this case, the write-in to the field memory 14 is performed in a sequence of the data arranged in the vertical direction and the read-out from the field memory 14 is performed in a direction perpendicular to the write-in direction, that is, in the horizontal direction.

Figure 5:
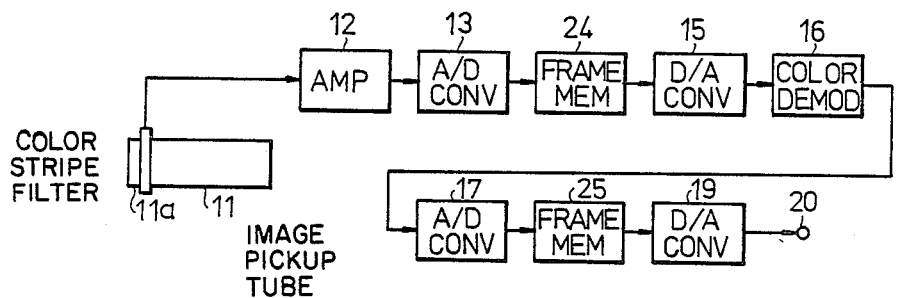
FIG. 5 is a system block diagram showing a second embodiment of the color image pickup device according to the present invention.
Figure 6:
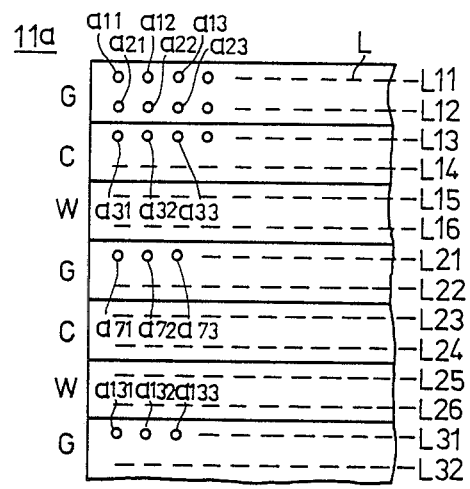
FIG. 6 is a diagram showing a portion of a color filter used in the second embodiment.

FIG. 5 shows a second embodiment of the color image pickup device according to the present invention, and FIG. 6 shows a portion of a color stripe filter used in the second embodiment for explaining the relationship between scanning lines and sampling positions. In FIGS. 5 and 6, those parts which are the same as those corresponding parts in FIGS. 1 and 2 are designated by the same reference numerals, and description thereof will be omitted.

As shown in FIG. 6, the color stripe filter 11a comprises a repetition of green (G), cyan (C) and white (W or transparent) stripes. In the present embodiment, the color image pickup device performs the scanning in the longitudinal direction of the color stripes of the color stripe filter 11a. The number of scanning lines L is set to such a number that the color stripe filter 11a can reproduce the samples. For example, the number of the scanning lines L for a stripe group consisting of the G, C and W stripes is set to six. There are 240 such color stripe groups (corresponding to one field of the NTSC system), for example. According to the energy step system, the fundamental wave component and the second harmonic component are to be reproduced. Thus, it may be understood from the sampling theorem that it is possible to reproduce the fundamental wave component and the second harmonic component when there are four or more scanning lines L per one stripe group.

In FIG. 5, a signal obtained from the image pickup tube 11 which is provided with the color stripe filter 11a shown in FIG. 6 is passed through the preamplifier 12 and is supplied to the A/D converter 13 wherein the signal is converted into a digital signal. The output digital signal of the A/D converter 13 is supplied to a frame memory 24. The digital signal is successively written into the frame memory 24 in a sequence of sampled data at sampling points a11, a12, a13, ..., a71, a72, a73, ..., a131, a132, a133, ..., a21, a22, a23, ... shown in FIG. 6. In other words, the sampled data are successively written into a predetermined area within the frame memory 24 as described before in conjunction with FIG. 3A in the direction of scanning lines L11, L21, L31, ..., L12, L22, L32, ..., L13, L23, ..., L14, L24, ..., L15, L25, ..., L16, L26, ....

The stored sampled data are successively read out of the frame memory 24 in a sequence of the sampled data at the sampled points a11, a21, a31, ..., a71, ..., a131, ..., a12, a22, a32, ..., a72, ..., a132, ..., a13, a23, a33, ..., a73, ..., a133, ... shown in FIG. 6. In other words, the stored sampled data are successively read out from the frame memory 24 in a direction perpendicular to the write-in direction, that is, in the vertical direction. The output signal of the frame memory 24 is supplied to the D/A converter 15 wherein the digital signal is converted in to an analog signal.

The output signal of the D/A converter 15 is similar to the color multiplexed signal shown in FIG. 4 obtained in the first embodiment described before.

The output signal of the D/A converter 15 is supplied to the color demodulating circuit 16 which has a construction similar to a color demodulating circuit used in the case of the step energy system. The signal supplied to the color demodulating circuit 16 is subjected to a color demodulation, but the picture which is obtained will be rotated by 90° because the read-out from the frame memory 24 is performed in the vertical direction. Hence, the output signal of the color demodulating circuit 16 is supplied to the A/D converter 17 wherein the signal is converted into a digital signal. As shown in FIG. 3B, the digital signal is successively written into a frame memory 25 in a sequence of sampled data at sampling points a11, a21, a31, ..., a71, ..., a131, ..., a12, a22, a32, ..., a72, ..., a132, ..., a13, a23, a33, ..., a73, a133, ... shown in FIG.6. The stored sampled data are successively read out of the frame memory 25 in a sequence of the sampled data at the sampled points a11, a12, a13, ..., a21, a22, a23, ..., a31, a32, a33, .... In other words, the stored sampled data are successively read out from the frame memory 25 in a sequence of the stored sampled data arranged in a direction perpendicular to the write-in direction. The output signal of the frame memory 25 is supplied to D/A converter 19 wherein the digital signal is converted in to an analog signal, and the output signal of the D/A converter 19 is obtained via the output terminal 20.

It is of course possible to perform a write-in to the frame memory 24 intermittently in the sequence of the sampling points on the scanning lines L11, L13, L15, ..., L12, L14, L16, ....

According to the present embodiment, the scanning is performed in the longitudinal direction of the stripes of the color stripe filter. For this reason, the color components obtained via the color stripe filter are multiplexed by a carrier having a relatively low frequency. As a result, the signal-to-noise ratio is high. In addition, the image pickup tube can reproduce the color stripes with a high fidelity, and the color reproducibility is satisfactory.

Moreover, since the scanning is performed in the longitudinal direction of the stripes of the color stripe filter, the color components obtained via the color stripe filter are not multiplexed in the sequence corresponding to the horizontal direction (scanning direction). For this reason, it is possible to obtain the same resolution as in the case of a black-and-white picture, and the frequency band of the luminance signal will not be limited by the color multiplexed signal (carrier). The frequency band of the luminance signal can be made wide, and it is possible to obtain a satisfactory horizontal resolution.

In the present embodiment, the sampled data of the signal obtained from the image pickup tube are intermittently obtained in the direction perpendicular to the scanning direction and are written into the frame memory in a sequence of the data arranged in the scanning direction. Hence, the present embodiment is especially effective when applied to a still television camera because the number of scanning lines per one field can be reduced.

The present invention is not limited to the NTSC system, and furthermore, the number of color stripe groups is not limited to that of the embodiment.

Further, the present invention is not limited to these embodiments, but various variations and modifications may be made without departing from the scope of the present invention.

What is claimed is:

1. A color image pickup device comprising:
   an image pickup tube;
   a color stripe filter comprising a plurality of stripes, said color stripe filter being arranged on said image pickup tube so that a longitudinal direction of the stripes of said color stripe filter is substantially parallel to a scanning direction of said image pickup tube, said color stirpe filter comprising a repetition of groups of stripes, each group of stripes being constituted by a first color stripe, a second color stripe and a transparent stripe, said image pickup tube having four or more scanning lines per one group of stripes;
   color multiplexed signal obtaining means for obtaining a color multiplexed signal by multiplexing color components obtained via said color stripe filter in a sequence corresponding to a direction perpendicular to said scanning direction; and
   color demodulating means for producing a color demodulated signal by subjecting said color multiplexed signal to a color demodulation.

2. A color image pickup device as claimed in claim 1 in which said color multiplexed signal obtaining means comprises an analog-to-digital converter for subjecting an output of said image pickup tube to an analog-to-digital conversion, a field memory for writing therein an output signal of said analog-to-digital converter in a sequence of data arranged in said scanning direction and for reading out therefrom the stored signal in a sequence of data arranged in a direction perpendicular to said scanning direction, and a digital-to-analog converter for subjecting an output of said field memory to a digital-to-analog conversion.

3. A color image pickup device as claimed in claim 1 in which said first color stripe is a green stripe and said second color stripe is a cyan stripe.

4. A color image pickup device as claimed in claim 1 which further comprises converting means for converting the color demodulated signal from said color demodulating means in a sequence of data arranged in said scanning direction.

5. A color image pickup device as claimed in claim 4 in which said converting means comprises an analog-to-digital converter for subjecting said color demodulated signal to an analog-to-digital conversion, a field memory for writing therein an output signal of said analog-to-digital converter in a sequence of data arranged in a direction perpendicular to said scanning direction and for reading out therefrom the stored signal in a sequence of data arranged in said scanning direction, and a digital-to-analog converter for subjecting an output of said field memory to a digital-to-analog conversion.

6. A color image pickup device as claimed in claim 4 in which said color multiplexed signal obtaining means comprises an analog-to-digital converter for subjecting an output of said image pickup tube to an analog-to-digital conversion, a field memory for writing therein an output signal of said analog-to-digital converter in a sequence of data arranged in said scanning direction and for reading out therefrom the stored signal in a sequence of data arranged in a direction perpendicular to said scanning direction, and a digital-to-analog converter for subjecting an output of said field memory to a digital-to-analog conversion.

7. A color image pickup device as claimed in claim 1 in which said color multiplexed signal obtaining means comprises a memory for intermittently writing therein a signal obtained from said image pickup tube in a sequence of data arranged in said scanning direction by taking only those data arranged intermittently in a direction perpendicular to said scanning direction, and for reading out therefrom the stored signal in a sequence of data arranged in the direction perpendicular to said scanning direction.

8. A color image pickup device as claimed in claim 7 in which said color multiplexed signal obtaining means further comprises an analog-to-digital converter for subjecting an output of said image pickup tube to an analog-to-digital conversion, said memory being a frame memory for intermittently writing therein an output signal of said analog-to-digital converter in a sequence of data arranged in said scanning direction by taking only those data arranged intermittently in the direction perpendicular to said scanning direction and for reading out therefrom the stored signal in a sequence of data arranged in the direction perpendicular to said scanning direction, and a digital-to-analog converter for subjecting an output of said frame memory to a digital-to-analog conversion.

9. A color image pickup device as claimed in claim 7 which further comprises converting means for converting the color demodulated signal from said color demodulating means in a sequence of data arranged in said scanning direction.

10. A color image pickup device as claimed in claim 9 in which said converting means comprises an analog-to-digital converter for subjecting said color demodulated signal to an analog-to-digital conversion, a frame memory for writing therein an output signal of said analog-to-digital converter in a sequence of data arranged in the direction perpendicular to said scanning direction and for reading out therefrom the stored signal in a sequence of data arranged in said scanning direction, and a digital-to-analog converter for subjecting the output of said frame memory to a digital-to-analog conversion.

11. A color image pickup device as claimed in claim 9 in which said color multiplexed signal obtaining means further comprises an analog-to-digital converter for subjecting an output of said image pickup tube to an analog-to-digital conversion, said memory being a frame memory for intermittently writing therein an output signal of said analog-to-digital converter in a sequence of data arranged in said scanning direction by taking only those data arranged intermittently in the direction perpendicular to said scanning direction and for reading out therefrom the stored signal in a sequence of data arranged in the direction perpendicular to said scanning direction, and a digital-to-analog converter for subjecting an output of said frame memory to a digital-to-analog conversion.

12. A color image pickup device comprising:
an image pickup tube;
a color stripe filter comprising a plurality of stripes, said color stripe filter being arranged on said image pickup tube so that a longitudinal direction of the stripes of said color stripe filter is substantially parallel to a scanning direction of said image pickup tube, said color stripe filter comprising a repetition of groups of stripes, each group of stripes being constituted by a green stripe, a cyan stripe and a transparent stripe, said image pickup tube having four or more scanning lines per one group of stripes;
color multiplexed signal obtaining means for obtaining a color multiplexed signal by multiplexing color components obtained via said color stripe filter in a sequence corresponding a direction perpendicular to said scanning direction; and
color demodulating means for producing a color demodulated signal by subjecting said color multiplexed signal to a color demodulation.

13. A color image pickup device as claimed in claim 12 which further comprises converting means for converting the color demodulated signal from said color demodulating means in a sequence of data arranged in said scanning direction.

14. A color image pickup device as claimed in claim 13 in which said converting means comprises an analog-to-digital converter for subjecting said color demodulated signal to an analog-to-digital conversion, a field memory for writing therein an output signal of said analog-to-digital converter in a sequence of data arranged in a direction perpendicular to said scanning direction and for reading out therefrom the stored signal in a sequence of data arranged in said scanning direction, and a digital-to-analog converter for subjecting an output of said field memory to a digital-to-analog conversion.

15. A color image pickup device as claimed in claim 13 in which said color mutliplexed signal obtaining means comprises an analog-to-digital converter for subjecting an output of said image pickup tube to an analog-to-digital conversion, a field memory for writing therein an output signal of said analog-to-digital converter in a sequence of data arranged in said scanning direction and for reading out therefrom the stored signal in a sequence of data arranged in a direction perpendicular to said scanning direction, and a digital-to-analog converter for subjecting an output of said field memory to a digital-to-analog conversion.

16. A color image pickup device as claimed in claim 12 in which said color multiplexed signal obtaining means comprises a memory for intermittently writing therein a signal obtained from said image pickup tube in a sequence of data arranged in said scanning direction by taking only those data arranged intermittently in a direction perpendicular to said scanning direction, and for reading out therefrom the stored signal in a sequence of data arranged in the direction perpendicular to said scanning direction.

17. A color image pickup device as claimed in claim 16 in which said color multiplexed signal obtaining means further comprises an analog-to-digital converter for subjecting an output of said image pickup tube to an analog-to-digital conversion, said memory being a frame memory for intermittently writing therein an output signal of said analog-to-digital converter in a sequence of data arranged in said scanning direction by taking only those data arranged intermittently in the direction perpendicular to said scanning direction and for reading out therefrom the stored signal in a sequence of data arranged in the direction perpendicular to said scanning direction, and a digital-to-analog converter for subjecting an output of said frame memory to a digital-to-analog conversion.

18. A color image pickup device as claimed in claim 16 which further comprises converting means for converting the color demodulated signal from said color demodulating means in a sequence of data arranged in said scanning direction.

19. A color image pickup device as claimed in claim 18 in which said converting means comprises an analog-to-digital converter for subjecting said color demodulated signal to an analog-to-digital conversion, a frame memory for writing therein an output signal of said analog-to-digital converter in a sequence of data arranged in the direction perpendicular to said scanning direction and for reading out therefrom the stored signal in a sequence of data arranged in said scanning direction, and a digital-to-analog converter for subjecting the output of said frame memory to a digital-to-analog conversion.

20. A color image pickup device as claimed in claim 18 in which said color multiplexed signal obtaining means further comprises an analog-to-digital coverter for subjecting an output of said image pickup tube to an analog-to-digital conversion, said memory being a frame memory for intermittently writing therein an output signal of said analog-to-digital converter in a sequence of data arranged in said scanning direction by taking only those data arranged intermittently in the direction perpendicular to said scanning direction and for reading out therefrom the stored signal in a sequence of data arranged in the direction perpendicular to said scanning direction, and a digital-to-analog converter for subjecting an output of said frame memory to a digital-to-analog conversion.

* * * * *